Dec. 9, 1924.
C. KNOBLOCH
LIQUID LEVEL GAUGE
Filed Dec. 20, 1921      2 Sheets-Sheet 2
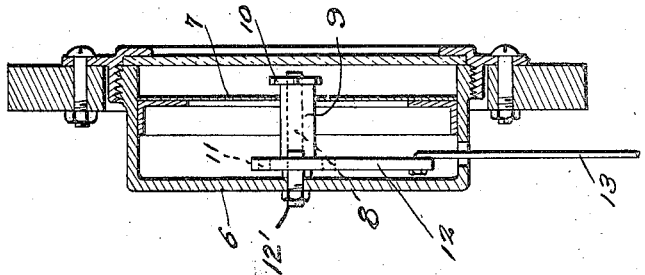
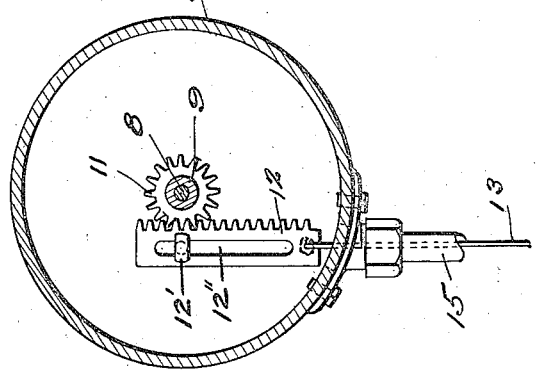
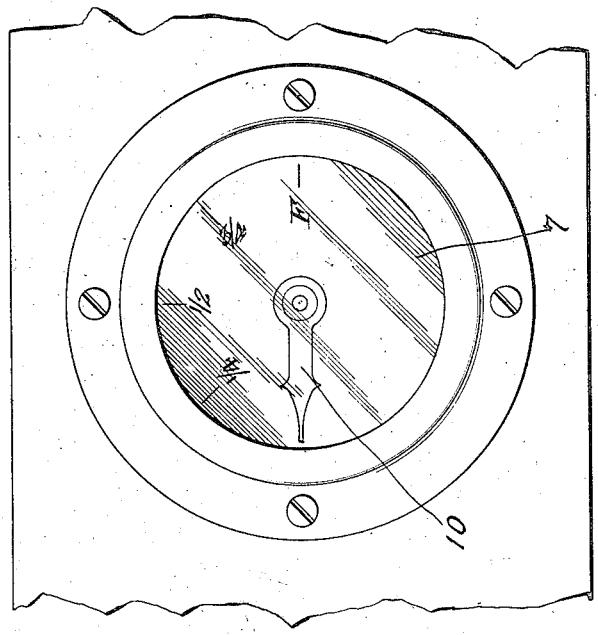

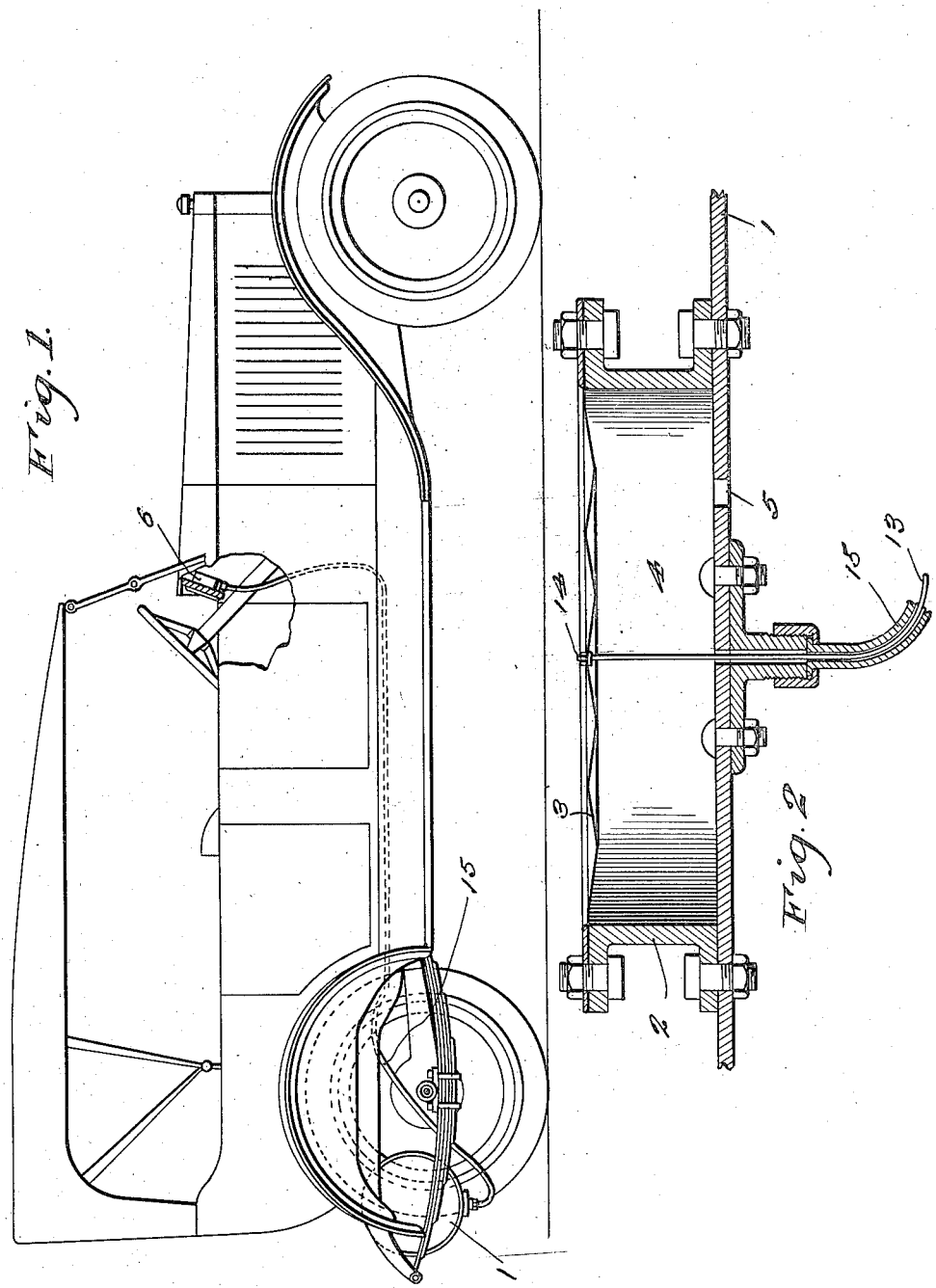

Patented Dec. 9, 1924.

1,518,435

UNITED STATES PATENT OFFICE.

CARL KNOBLOCH, OF EAU CLAIRE, WISCONSIN.

LIQUID-LEVEL GAUGE.

Application filed December 20, 1921. Serial No. 523,669.

*To all whom it may concern:*

Be it known that I, CARL KNOBLOCH, a citizen of the United States, residing at Eau Claire, in the county of Eau Claire and State of Wisconsin, have invented new and useful Improvements in Liquid-Level Gauges, of which the following is a specification.

This invention relates to improvements in gauges, the general object of the invention being to provide a gauge, mainly designed for indicating the amount of gasoline in the tanks of motor vehicles, and which is actuated by the weight of the liquid in the tank.

Another object of the invention is to provide indicating means, preferably arranged upon the instrument board, which are actuated by the device in the tank so that the operator of the vehicle can tell at a glance just how much gasoline he has in the tank.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of an automobile showing the invention in use.

Figure 2 is a detail sectional view through that part of the device which is located in the tank.

Figure 3 is a face view of that part of the device which is located on the dash.

Figure 4 is a sectional view through the indicating means.

Figure 5 is a similar view taken at right angles to the section shown in Figure 4.

In these views 1 indicates a tank of an automobide, to the bottom of which is secured a cylindrical member 2 which is flanged at its upper and lower ends, the bottom flange being riveted or otherwise connected with the bottom of the tank. A corrugated plate 3 is riveted to the upper flange, said plate and member forming a chamber 4 in the bottom of the tank which is in communication with the outside air by means of the holes 5 made in the bottom of the tank. The plate 3 is preferably made of flexible steel so that it will move downwardly under the weight of the gasoline above it and I utilize this movement of the plate, which forms a diaphragm, to actuate indicating means which are preferably placed on the dash or instrument board of the vehicle. Such means consists of a casing 6 having a dial 7 thereon and having a shaft 8 mounted therein which rotatably supports an arbor 9, to the outer end of which is secured a finger 10 and to the inner end of which is secured a pinion 11. A rack 12 is slidably mounted in the casing and engages the pinion. The rack is preferably supported by the bolt 12' engaging a slot 12'' formed on the rack, the bolt passing through the bottom of the casing 6. This rack is connected by a rod or wire 13 with the diaphragm or plate 3, the rod or wire being secured to the middle of the diaphragm, as shown at 14. A tube 15 surrounds the wire and has its ends suitably secured to the gasoline tank and to the casing 6. It will thus be seen that the movement of the diaphragm will be communicated to the finger through the arbor, pinion and rack, the parts being so constructed and arranged that the indicator will indicate the amount of gasoline in the tank.

This device can be used in tanks of automobiles which use either the vacuum or pressure systems and it can also be used in tanks of automobiles which depend upon gravity to cause the gasoline to flow from the tank.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a tank, an upright annular supporting member secured to the bottom of the tank, a diaphragm carried by the upper end of said member and forming therewith a closed chamber adapted to be submerged in the liquid in the tank, the bottom of the tank having an opening therein for placing the interior of the chamber in communication with the atmosphere, an indicator, and a flexible member connecting said indicator and diaphragm for transmitting the movement of the diaphragm to the indicator.

2. In a motor vehicle, a flanged member secured to the bottom of the fuel tank thereof, a diaphragm carried by the said member and forming therewith a closed chamber, the bottom of the tank having an opening therein which places the chamber in communication with the atmosphere, an indicator on the instrument board and including a dial and finger, a shaft carrying the finger, a pinion thereon and a rack engaging the pinion and a flexible member having one end connected with the diaphragm and its other end connected with the rack, and a guide tube for said flexible member extending from the bottom of the tank to the indicator.

3. In a motor vehicle, a member secured to the bottom of the fuel tank thereof, a diaphragm carried by the said member and forming therewith a closed chamber which is adapted to be submerged in the liquid in the tank, the bottom of the tank having an opening therein which places the chamber in communication with the atmosphere, an indicator on the instrument board, a flexible member having an end connected with the diaphragm and its other end connected with the indicator, and a guide tube for said flexible member extending from the bottom of the tank to the indicator.

4. In a motor vehicle, the combination of a fuel tank, a hollow member secured to said fuel tank, a diaphragm mounted on said hollow member and forming therewith a chamber, said diaphragm being exposed on one side to the weight of liquid in said tank, said member having an opening for venting the interior of said chamber to the atmosphere whereby the other side of said diaphragm is subject to atmospheric pressure, an indicator, a flexible member having one end connected with said diaphragm and its other end connected with said indicator, and a guide tube for said flexible member extending from said hollow member to said indicator.

In testimony whereof I affix my signature.

CARL KNOBLOCH.